United States
Fitzgibbons et al.

[11] 3,751,137
[45] Aug. 7, 1973

[54] LIQUID CRYSTAL DISPLAY DEVICE

[75] Inventors: Eugene T. Fitzgibbons, Anaheim; Raymond P. Slowinski, La Habra, both of Calif.

[73] Assignee: North American Rockwell Corporation, El Segundo, Calif.

[22] Filed: Oct. 18, 1971

[21] Appl. No.: 189,991

[52] U.S. Cl. .......................... 350/160 LC, 340/336
[51] Int. Cl. ............................................. G02s 1/16
[58] Field of Search .............. 350/160 LC; 340/336

[56] References Cited
UNITED STATES PATENTS

| | | | |
|---|---|---|---|
| 3,505,804 | 4/1970 | Hofstein | 350/160 LC UX |
| 3,674,341 | 7/1972 | Hedman, Jr. et al. | 350/160 LC |
| 3,592,526 | 7/1971 | Dreyer | 350/160 LC UX |
| 3,647,280 | 3/1972 | Klein et al. | 350/160 LC |
| 3,499,112 | 3/1970 | Heilmeier et al. | 350/160 LC X |
| 3,625,591 | 12/1971 | Freiser et al. | 350/160 LC X |

Primary Examiner—Edward S. Bauer
Attorney—L. Lee Humphries, G. Donald Weber, Jr. et al.

[57] ABSTRACT

The device has top and bottom plates including one projecting edge for supporting conductor input leads. The plates are separated as well as secured together by a glass frit raised border. A liquid crystal material is injected, via openings in the border along the edge of the two plates, into the space between the two plates. Transparent and conductive segments comprising the display characters are formed on the inner surface of one of the plates. Conductive elements corresponding to each of the display characters are formed on the inner surface of the opposite plate. A reflective type display includes a reflecting layer on the outer surface of the second plate.

4 Claims, 5 Drawing Figures

INVENTORS
EUGENE T. FITZGIBBONS
RAYMOND P. SLOWINSKI
BY
Robert G. Rogers
ATTORNEY

PATENTED AUG 7 1973

INVENTORS
EUGENE T. FITZGIBBONS
RAYMOND P. SLOWINSKI

BY Robert G. Rogers
ATTORNEY

LIQUID CRYSTAL DISPLAY DEVICE

BACKGROUND OF THE INVENTION

1. Field of the Invention

The invention relates to a liquid crystal display device and more particularly to such a device in which a glass frit border seals and connects the two conductor containing plates while providing a reservoir for the liquid crystal material.

2. Description of Prior Art

Liquid crystal materials are classified according to the arrangement of their molecules into three categories, namely, nematic, cholesteric, and smectic. Normally, in the case of nematics, the liquid crystals are quiescent and essentially transparent in the absence of drive voltages. Whenever drive voltages of sufficient amplitude and duration are applied to conductors on both sides of the materials, the molecular arrangement is altered so that the liquid crystal materials become opaque. As a result, light passing through the opaque liquid crystal material is forward scattered to form a contrast with the liquid crystal material which remains quiescent. When the drive voltages are removed, the material returns to its transparent condition after a finite period of time. If the drive voltages are reapplied within the finite period, the display continues without interruption. Generally, cyclical drive voltages are used for that purpose.

Liquid crystal displays may be shown in the prior art reflective or transmissive as shown in FIGS. 4 and 5, respectively. In a typical reflective type of display device, light from a suitable source is directed onto the liquid crystal display. In the absence of a drive voltage, the light rays from the source are reflected by the liquid crystal materials onto a nonreflecting surface comprising part of the display device. As a result, the viewer does not see the display. However, if a drive voltage is applied to the conductors on both sides of the liquid crystal material, the material becomes opaque and light from source is forward scattered from the liquid crystal material. As a result, a character is generated and is visible to the viewer.

In a transmissive type of display device light from a light coupling device is focused onto the liquid crystal display. In the absence of drive voltages, the light is reflected from the liquid crystal material onto a nonreflecting surface such that a display is not visible to the viewer. However, when a drive voltage is applied to the liquid crystal display, the light is forward scattered so that the rays are directed towards the viewer. A character is thus displayed.

Although various tupes of liquid crystal materials may be utilized in display devices, generally nematic, mesomorphic materials are preferred. It is known that the domains of molecules in the nematic, mesomorphic materials are preferred. It is known that the domains of molecules in the nematic, mesomorphic liquid crystal materials can be aligned by electric and magnetic fields.

Nematic liquid crystals have been used in the past in crystal displays, light valves and the like for polarized light. In such devices the molecular domains in a layer of liquid crystal material are aligned for example by impressing an electric field along the layer in a direction parallel to the plane of the layer. In the earlier devices polarized light was being controlled and the molecular domains were aligned by an electric field applied parallel to the plane of the layer.

U. S. Pat. No. 3,322,485 to R. Williams, May 30, 1967 for an "Electro-optical Elements Utilizing an Organic Nematic Compound" illustrates one example of a liquid crystal display device. The liquid crystal material is disposed between two substrates at least one of which is transparent. The second substrate is transparet or reflecting and each include conduct-ing films on opposing surfaces. The conducting films are shown in the form of parallel shrips which can be selectively energized.

U. S. Pat. No. 3,499,112 to G. H. Heilmeier et al., Mar. 3, 1970, for an "Electro-optical Device" illustrates a second example of a liquid crystal display using a different type of liquid crystal material. In the Heilmeier patent, the liquid crystal layer is described as producing non-destructive turbulence of the molecules of the liquid crystal material resulting in dynamic scattering. The Williams patent teaches a liquid crystal material which is controlled by an electric field. The Heilmeier liquid crystal materials are appraently controlled by a type of current flow through the liquid crystal material.

SUMMARY OF THE INVENTION

Briefly, the liquid crystal display device comprises a thin film of nematic liquid crystal materials secured between two transparent plates. Conductive electrodes on the inner surfaces of both plates are used to form display characters such as numbers or letters. The electrodes on the first plate are transparent and in the form of segments which can be selectively energized to produce various characters. Individual conductors are provided for each of the segments. Electrodes are formed on the inner surface of the second plate by a homogeneous layer having a configuration equivalent to the configuration of the conductor segments for each display position.

A glass frit border is formed on one or both of the plates. The two plates are sealed together by the glass frit which also creates a space, or reservoir for the liquid crystal material, between the plate. Heat or other energy is applied to bond the glass frit layer to the adjacent plate. However, openings are provided through the glass frit border so that the liquid crystal material can be injected into the openings. The openings are subsequently sealed by an epoxy material which can be conductive for electrically connecting the electrodes on the second plate to an input conductor on the first plate. Typically, glass frit comprises a powered glass material in an organic binder. A temperature range of between 500° C and 700° C may be used in bonding the plates together.

In one embodiment, at least one projecting edge is provided for the conductors providing drive voltages to the electrodes on the second plate as well as to the conductor segments on the first plate. The projecting edge is also beneficial when the display is electrically connected to a circuit board for example containing the drive electronics for the liquid crystal display device. For example in one embodiment, a ceramic circuit board or a standard printed circuit board comprising a number of integrated circuits is formed with an opening sufficient to accommodate the liquid crystal display. The display is placed in the opening in such a manner that the conductors on the projecting edge are aligned with conductors on the ceramic or printed circuit board for providing electrical connections to the liquid crystal display. The circuit board can then be mounted for example in a calculator housing.

For a transmissive type of structure, the inner surface of the second plate is coated with a transparent conduting layer. If a reflective type of device is utilized, the outer surface of the secondlayer as well as the inner electrodes are comprised of a reflecting material such as gold for producing relatively clear displays.

An object of this invention is to provide an improved liquid crystal display device in which a sealing material is used to electrically connect electrodes on one plate of a liquid crystal display to leadin conductors on the opposing plate of liquid crystal display.

A further object of this invention is to provide a liquid crystal display device in which at least one of the plates comprising the liquid crystal display is provided with one or more projecting edges onto which leadin conductors are formed such that the projecting edge can be used for mounting the display or a circuit board containing the drive electronics for the display device.

DESCRIPTION OF THE PREFERRED EMBODIMENTS

Figure 4:
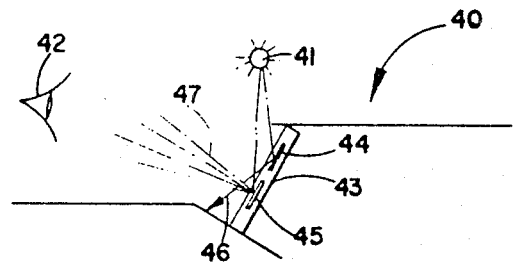
FIG. 4 illustrates a reflective type of liquid crystal display device.
Figure 5:
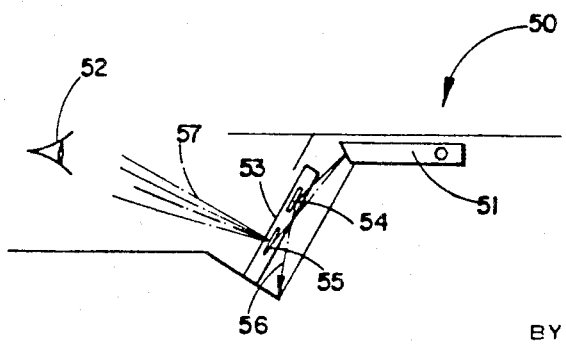
FIG. 5 illustrates a transmissive type of liquid crystal display device.

Reference is made to FIGS. 4 and 5 wherein are shown liquid crystal displays known in the art. In particular, FIG. 4 shows a reflective type display while FIG. 5 shows a transmissive type of display. In the reflective type of display device 40 shown in FIG. 4, light from a suitable source 41 is directed onto the liquid crystal display unit 43. In the absence of a drive voltage supplied by conductors (not shown) the light rays 46 from the source are reflected by the liquid crystal materials, such as identified generally by numeral 44, onto a non-reflecting surface comprising part of the display device. As a result, the viewer 42 does not see a display. However, when a drive voltage is applied to the conductors (not shown) on both sides of the liquid crystal material, the material becomes opaque and the light from source 41 is forward scattered as represented by rays 47 from "activated" liquid crystal material represented generally by 45. As a result, a display is generated and is visible to viewer 42.

FIG. 5 shows a transmissive type of display device 50 wherein light from a suitable source or light coupling device 51 is focused onto liquid crystal display 53. In the absence of drive voltages, the light represented generally by line 56 is reflected from the liquid crystal material 54 onto a non-reflecting surface such that a display is not visible to viewer 52. However, when the drive voltages are applied to the liquid crystal display 53, the liquid crystal material is "activated" wherein the light is forward scattered so that the rays, represented, generally by numeral 57, are directed towards viewer 52. Thus, a character is displayed.

Figure 1:
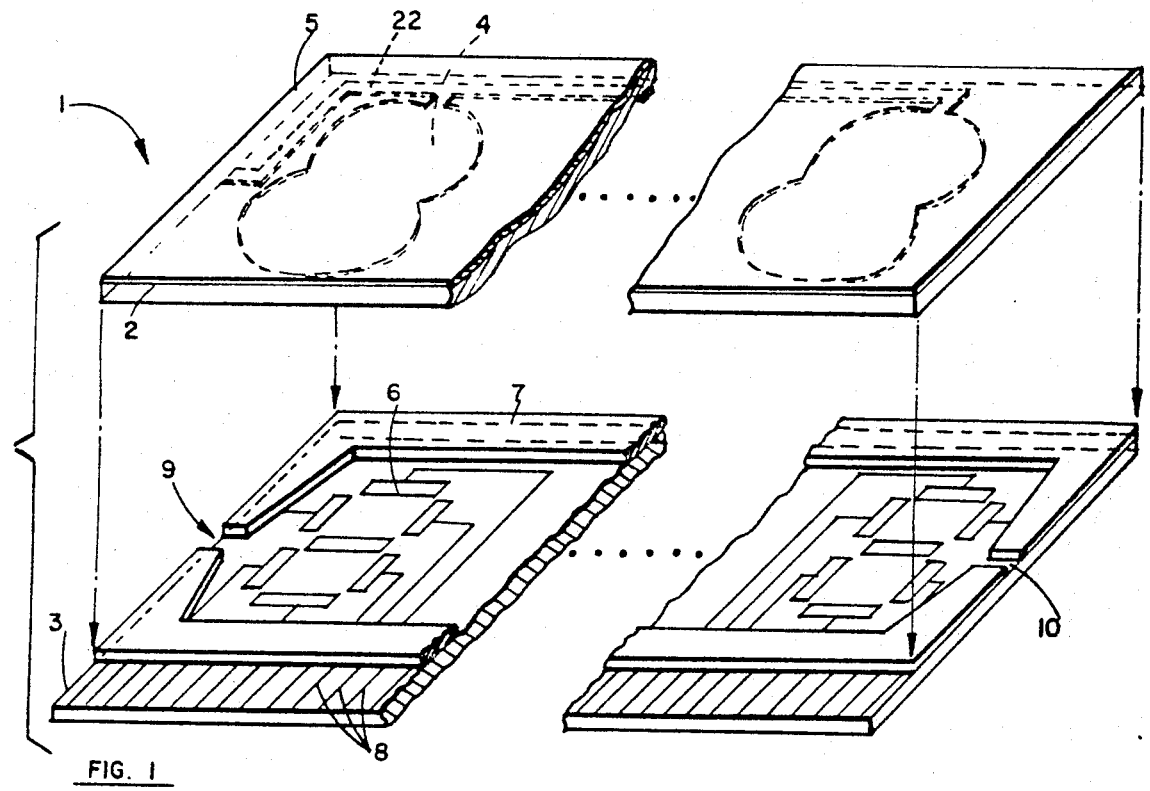
FIG. 1 is an exploded view of a reflective type liquid crystal display device comprising two parallel plates sealed together by means of a glass frit border.

As referring now to FIG. 1, there is shown an exploded view of a liquid crystal display device 1 including parallel plates 2 and 3 which may be formed of a light transmitting glass or similar material. For example, glass plates having dimensions of 76 mm × 25 mm × 1 mm are suitable.

Electrodes 4 (shown in dashed outline) for each of the display positions are formed on the inner surface of plate 2. Since the FIG. 1 embodiment is a reflective type of liquid crystal display, the electrodes 4 are comprised of a reflecting conductor such as gold. The electrodes have a configuration which is compatible with the characters which can be displayed by the device. The electrodes are connected together by means of a conducting strip 22 (shown in dashed outline) which terminates at one end of the plate 2 as shown. In addition, reflecting layer 5 is formed on the back or outer surface of the plate 2 to provide a further improved reflection during the operation of the device.

The plate 3 comprises conductor segments 6 for each displays position. By selectively applying drive volages via conductor lines 8 to selected ones of the segments 6, while simultaneously applying a drive voltage to the electrodes 4, various display characters can be generated. The characters would be viewed through the bottom surface of plate 3. The glass frit border 7 is formed around the edges of both of the plates and encompasses the conductor segments 6 as well as the back electrodes 4. The glass frit border has a thickness sufficient to enable the liquid crystal materials to be inserted between the two plates via ports or openings 9 and 10. In addition, the glass frit material is used to hermetically seal the glass plates together.

Figure 2:
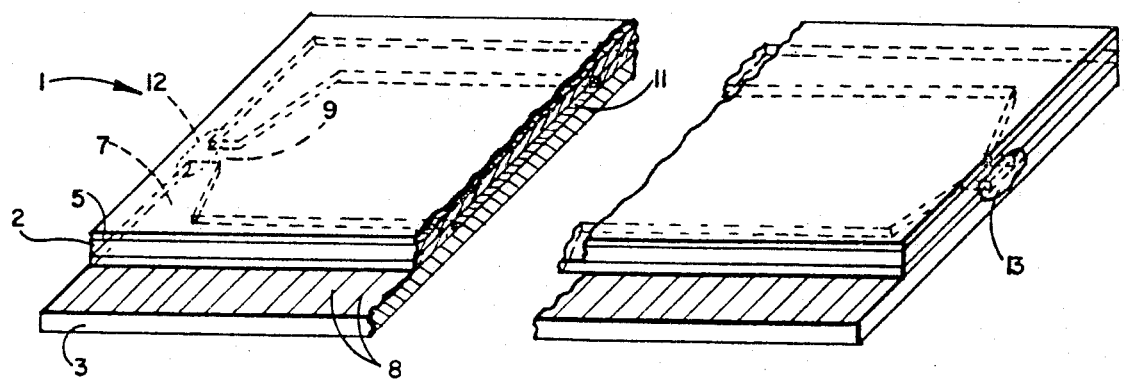
FIG. 2 is a second view of the FIG. 1 device in which the elements have been assembled and a liquid crystal material has been injected between the two plates. The injection openings are shown sealed.

FIG. 2 illustrates a completed embodiment in which the liquid crystal material 11 for example approximately 25 microns thick is shown disposed between the plates 2 and 3. Ports 9 and 10 are shown sealed by materials 12 and 13. For example, a conductive epoxy, solder, or other suitable materials may be used to seal the openings.

Figure 3:
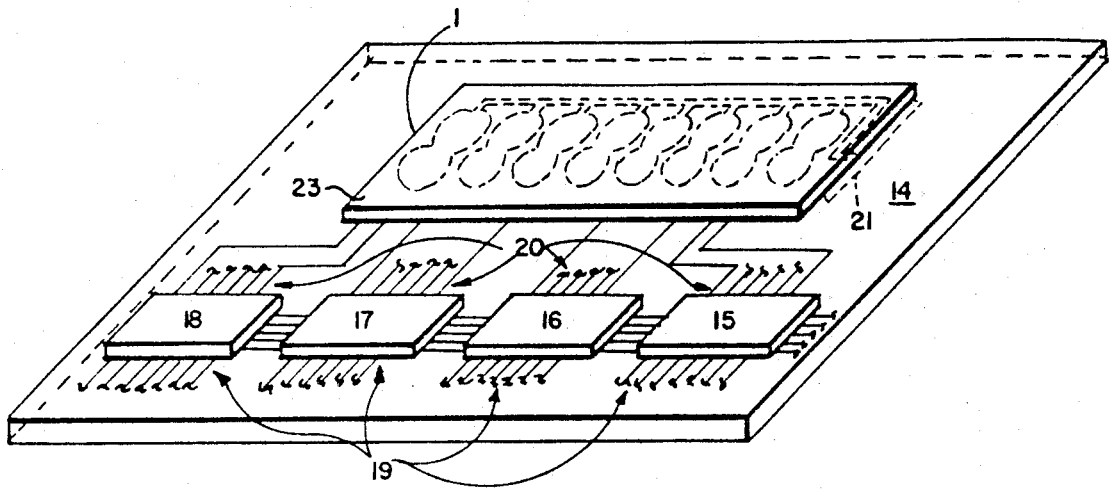
FIG. 3 illustrates one embodiment of a liquid crystal display device assembled on a printed circuit board containing drive electronics.

FIG. 3 illustrates one application of the FIG. 2 liquid crystal display device. The device 1 is shown inserted into an opening 21 in element 14 which may be a ceramic, or standard printed circuit board. The extended edge 23 of plate 3 is used to electrically connect conductors 8 (not shown in FIG. 3) to the conductors represented generally by numeral 20. The outer surface of plate 3 is shown in FIG. 3. The plate 2 is concealed since it is inserted into the opening 14. The conductors 20 electrically connect the drive electronics represented by packaged integrated circuits 15 through 18 which are disposed on the printed circuit board. Input conductors to the drive electronics are represented by numeral 19.

Since the segments 6 comprising the conductors at each position of the display are transparent, only the conducting electrodes 4 can be seen by viewer looking at the display from the back surface of plate 3. In addition, the gold reflecting layer 5 would alsc appear uniformly behind the elecrodes 4. Layer 5 helps to redue or eliminate shadows which can otherwise occur when generating aliquid crystal display.

FIG. 4 represents a reflective type liquid crystal device and FIG. 5 represents a transmissive type liquid crystal device. These types of devices, which are known in the art, have already been discribed, and it is not believed necessary to add additional description. It is pointed out, owever, that for a transmissive type of display, the electrodes 4 would be fabricated by the use of a transparent material similar to the transparent conductors of segments 6. In addition, the reflecting layer 5 would be eliminated.

In one process contemplated by this invention, the liquid crystal display device can be produced by initially masking the inner surface of plate 3. Subsequently, the conducint segments 6 comprising a material such as tin oxide are deposited on the exposed portions of the plate for example by means of a high temperature stannous chloride spray. The mask is removed and the glass frit border is screened about the periphery of the plate 3 in the configuration shown in FIG. 1. The screening is arranged to leave openings 9 and 10 at the edges of the display device.

Gold, for example, is screened and fired on the inner and outer surfaces of plate 2 for forming elecrodes 4 and layer 5. Although not shown, a second glass frit border could be formed on the inner surface of plate 2. The plates are placed together so that the glass frit borders are aligned, when two are used, or otherwise so that the electrodes 4 are aligned with the segments 6 at each display position. The assebmly is fired at a relatively high temperature so that the glass frit material fuses the two plates together and forms a hermetic seal except for opernings 9 and 10. The reservoir formed between the plates is filled with a liquid crystal material and the openings 9 and 10 are sealed. A typical thickness of the two plates separated by the glass frit may be approximately 1 mil. In one process step, the openings 9 and 10 can be sealed by applying a metal film around the edges of the openings which is fused to the glass of plates 2 and 3. Subsequently, the solder can be applied to the opening which is electrically conneced to the metal film. A relatively low temperature process must be utilized to avoid damaging the liquid crystal material. In another embodiment, an indium based solder which bonds directly to the glass without the necessity for the metal film may be utilized. In still other variations, a conducng epoxy can be used. It is pointed out that the conducting strip 22 is electrically connected to an input line 8 on plate 3 through the conducting material used to fill the opening 9.

Various process techniques can be used to connect the leads 8 to the leads 20 as shown in FIG. 3. For example, beam leads can be utilized. In other processes, plated terminations can be formed at the ends of the conductors 8 for mating with similar teminations at the ends of conductors 20. The plated terminations can then be bonded to the other. Circuit board 14 can be an epoxy circuit board processed in a normal manner by etching a conductor pattern from a copper layer. In other embodiments a ceramic board can be utilized.

In operation, drive voltages provided from the device electronics are selectively applied to certain of the segments 6 at one or more of the display positions while simultaneously applying a drive voltage to electrodes 4 via line 22. Either by electric field or by a type of current flow, the molecular arrangement of the liquid crystal material 11 between the plates is rearranged so that light either from a source such as 41 or source such as 51 is forward scattered to produce a corresponding visual display. It is not believed necessary to provide additional details about the electronics of the liquid crystal display. Drive voltages of between 10 and 25 volts can be used. It should be understood, however, that the drive voltages depend upon the spacing between the plates as well as the type of liquid crystal material used.

We claim:

1. A liquid crystal display device having at least one display position comprising,
    first and second transparent plates,
    a non-conductive glass frit border on at least one of the plates for spacing said plates apart and forming a hermetically sealed reservoir between said plates, said border extending substantially entirely around the periphery of said plates and including at least one opening therein for permitting injection of liquid crystal material into the reservoir between said plates,
    a first set of conductor electrodes disposed on the inner surface of said first plate at each display position,
    a common conductor connected to each of the conductor electrodes in said first set of conductor electrodes in order to supply signals thereto,
    a second set of conductor electrodes disposed on the inner surface of said second plate, each of said second set of conductor electrodes including a plurality of conductor segments for enabling the selective generation of a plurality of different characters at each display position, separate conductors connected to each of said segments to supply signals thereto, said first and second plates being connected together by said border for aligning corresponding conductor electrodes of said first and second sets of conductors at each display position,
    at least one of said first and second plates includes an extended portion thereof which projects beyond the edge of the other of said plates,
    input conductors on said extended portion for supplying selectively applied drive voltages to said first and second set of conductors electrodes, and
    a conducting material sealer for sealing said opening in said border and for electrically connecting said common conductor connected to said first set of conductor electrodes to a conductor on said second plate.

2. The liquid crystal display device recited in claim 1 wherein said first set of conductors is comprised of a reflecting material, and wherein said first plate further includes a reflecting layer disposed on the back surface thereof whereby a reflective type of liquid crystal display device is formed.

3. The liquid crystal display device recited in claim 1 wherein said first and second sets of conductor electrodes are comprised of a transparent conducting material whereby a transmissive type of liquid crystal display is formed.

4. A liquid crystal display device as recited in claim 1 including a circuit board for supporting said liquid crystal display device,
    electronic means at said circuit board for providing drive voltages to said liquid crystal display device, said cricuit board including an opening for accommodating one of said first and second plates, said opening having a configuration for enabling the extended portion of said first or second plate to be used in mounting the liquid crystal display device to the printed circuit board.

* * * * *

PO-1050
(5/69)

UNITED STATES PATENT OFFICE
CERTIFICATE OF CORRECTION

Patent No. 3,751,137           Dated August 7, 1973

Inventor(s) Eugene T. Fitzgibbons et al

It is certified that error appears in the above-identified patent and that said Letters Patent are hereby corrected as shown below:

Column 1, line 29, change "shown" to --known--.

Column 2, line 11, change "shrips" to --strips--.

Column 3, line 8, change "secondlayer" to --second layer--.

Column 4, line 67, change "aliquid" to --a liquid--.

Column 5, line 6, change ",owever" to --, however--, line 14, change "conducint" to --conducting--, line 16, change "plate" to --plate 3--, line 29, change "assebmly" to --assembly--, line 32, change "opernings" to --openings--, line 46, change "conducng" to --conducting--.

Signed and sealed this 20th day of November 1973.

(SEAL)
Attest:

EDWARD M. FLETCHER, JR.
Attesting Officer

RENE D. TEGTMEYER
Acting Commissioner of Patents